US007671299B2

(12) United States Patent
Gifford et al.

(10) Patent No.: US 7,671,299 B2
(45) Date of Patent: Mar. 2, 2010

(54) INTERNAL HANDLEBAR HEATER

(76) Inventors: Charles Jacob Gifford, 1460 Amundson La., Stillwater, MN (US) 55082; Joseph Roger Plessel, 861 Overton Dr., Fridley, MN (US) 55432; Roland Benjamin Knapton, 2551 38th Ave. NE., St Anthony, MN (US) 55421

( * ) Notice: Subject to any disclaimer, the term of this patent is extended or adjusted under 35 U.S.C. 154(b) by 67 days.

(21) Appl. No.: 11/712,170

(22) Filed: Feb. 28, 2007

(65) Prior Publication Data
US 2007/0221644 A1 Sep. 27, 2007

Related U.S. Application Data

(60) Provisional application No. 60/779,921, filed on Mar. 8, 2006.

(51) Int. Cl.
*H05B 3/58* (2006.01)
(52) U.S. Cl. .................. 219/204; 219/535; 219/549; 74/551.9
(58) Field of Classification Search .......... 219/200–206, 219/494, 544, 548, 549–552, 535; 74/551.8, 74/551.9, 552, 761, 558.5
See application file for complete search history.

(56) References Cited

U.S. PATENT DOCUMENTS

| 3,667,315 | A | * | 6/1972 | Polly, Sr. ................... 74/551.8 |
| 6,114,668 | A | * | 9/2000 | Ogata et al. ................. 219/494 |

* cited by examiner

*Primary Examiner*—Mark H Paschall
(74) *Attorney, Agent, or Firm*—Thomas E Fredeen

(57) ABSTRACT

A heating assembly used for providing heat to the hands of a person using equipment with handlebars. The heating assembly is installed internal to the handlebars and provides heat to the handlebar grips normally installed on equipment of this type. This system works with existing grips, i.e. special heated grip systems are not required. The current invention is thus usable with a wider variety of handlebar grip devices currently used on motorcycles, snowmobiles, snow blowers and other outdoor devices utilizing handlebars.

13 Claims, 4 Drawing Sheets

INTERNAL HANDLEBAR HEATER

CROSS REFERENCE TO RELATED APPLICATIONS

This application is based on provisional application Ser. No. 60/779,921, filed on Mar. 8, 2006.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates to the heating of handlebar grips and the method of manufacturing such heaters. Most heated grips have the heaters incorporated into the grip or the heating element is adhered to the handlebar under the grip. Because of the numerous manufacturers of vehicles with handlebars and the numerous types and styles of grips used on these handlebars it is very difficult to supply heated grips that can be installed and utilized on this wide variety of machines. Because of this wide variety, the heated grips and heaters that are supplied for the grips have various advantages and disadvantages from ease of installation, reliability, heating capacity, esthetics, safety, or cost.

In the operation of vehicles or equipment with handlebars where the operators are exposed to lower temperatures and wind chill, because of the moving cold air, the operator's hands typically get cold first. The cold handlebars and grips also transfer heat away from the hands and combined with the cold air can make it very uncomfortable and even create a hazardous condition. Many heated grips have been utilized to address the problems related to keeping the hands warm and this heated grip technology is well known. However, improvements are required to make them easier to install, easier to replace, more universal, easier to manufacture, more economical and add safety for the operators.

There are many patents related to this prior art in the heated grip area. These patents cover many aspects of heated grips from the position for mounting the heaters, the assembly of the heaters into the grips, the method of manufacturing the heated grips, the electronic controls that are used with the heated grips, and even methods of locking the heated grips to the handlebars. There is only one patent, U.S. Pat. No. 3,667,315, that references placing the grip heater on the inside of the handlebar and that design utilizes a cartridge style of heater. This design is simple but not desirable because the rigid cartridge diameter has to be smaller than the inside diameter of the handlebar and when inserted only allows for a line of contact to transfer the heat to the handlebar. This results in one side of the handlebar being hot and the other side quite cold along with areas of the hands.

There are heated grip patents that are written specifically for vehicles such as motorcycles like U.S. Pat. Nos. 5,613,407, 5,735,037, and 6,984,807. These heated grip designs do define the use with motorcycles but one can readily recognize the utility with other vehicles. A number of patents reference special electronic controls for the heated grips like U.S. Pat. Nos. 6,844,524 and 6,927,367, however this technology is well known and can be utilized with most heater controls other than these for the handlebar grips.

SUMMARY OF THE INVENTION

This invention will highlight a new spring loaded grip heater design that allows the grip heater assemblies to be installed on the inside of the handlebars of vehicles and equipment. This unique design can be utilized in the handlebars on motorcycles, ATV's, snowmobiles, three wheel buggies, or equipment like snow blowers. The new internal handlebar heaters are typically located in the bar under the grips, and thus provide heat to keep the operator's hands warm from within the handlebar. They are designed so they can be easily installed. Other advantages of this internal heater design is that they are compatible with all of the handlebars, specifically designed heated grips are not required, removable grips do not need to be replaced when heated grips are desired, they are protected from the elements, will not wear out, and grips can be replaced without having to purchase new heated units. The present invention has been made in view of the above-described improvements desired when compared to current methods of providing handlebar grip heating.

In one aspect, the invention describes a handlebar heating assembly for use in hollow handlebars, comprising: a) a planar heating element, wherein the heating element is formed into a cylindrical shape sized to allow the heating element to fit coaxially into an open end of the handlebar and shaped to provide substantial contact with the handlebar; and b) a power source connected to said heating element. The power source may be a battery. The heating assembly may further comprise a means for controlling the temperature of the heating element.

In a further aspect, the handlebar heating assembly further comprises a spring clip or metal coil, wherein the spring clip is capable of being compressed radially to a size to allow the spring clip to fit coaxially in the open end of the handlebar and upon release of the compression, the spring clip expands radially to provide substantial contact of the spring clip with the handlebar. The spring clip may optionally be secured to the heating element. The heating element may be powered by a battery. A means for regulating the temperature of the heating element is desirable.

In a still further aspect of the invention, a method is described for heating a handlebar comprising the steps of: a) providing a handlebar with an internal space, b) providing a planar heating element wherein said heating element is formed into a cylindrical shape sized to allow the heating element to fit coaxially into an open end of the handlebar and shaped to provide substantial contact with the handlebar, and c) providing a power source for the heating element. A battery may be the source of power for this method.

In another further aspect of the invention, the method of heating a handlebar further comprises a spring clip to which the heating element is attached. The spring clip is capable of being shaped into a cylindrical form capable of being compressed radially to a size to fit coaxially within the internal space in the handlebar. Upon release of the compression, the spring clip should expand radially to provide substantial contact of the spring clip with the handlebar. This method may further include the step of providing a means for controlling the temperature of the heating element.

The invention that will be described in the following sections with details and drawings is an improved grip heater design that is very efficient, easy to install, lower cost, and can be utilized with controllers and indicators that offer various mounting options and can provide a safer design that is ergonomic and user friendly.

DETAILED DESCRIPTION

This detailed description will define the Internal Handlebar Heater and its unique applications and options. This internal heater along with the associated electronic controller, with the heat level selection switch and LED indicators, will offer the easiest to install and safest grip heater on the market. Heated grips require some type of heat level control for the operator's comfort so this description will also address areas that describe how the associated electronic heat controller design offers improvements and unique features.

Figure 1:
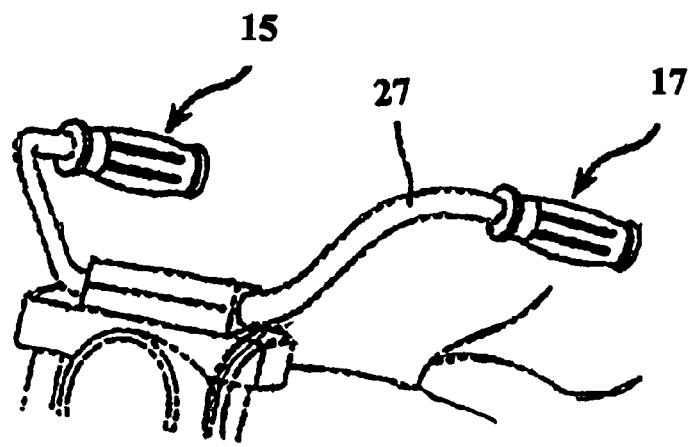
FIG. 1 is a perspective view of the handlebar on a motorcycle with the grips attached.
Figure 2:
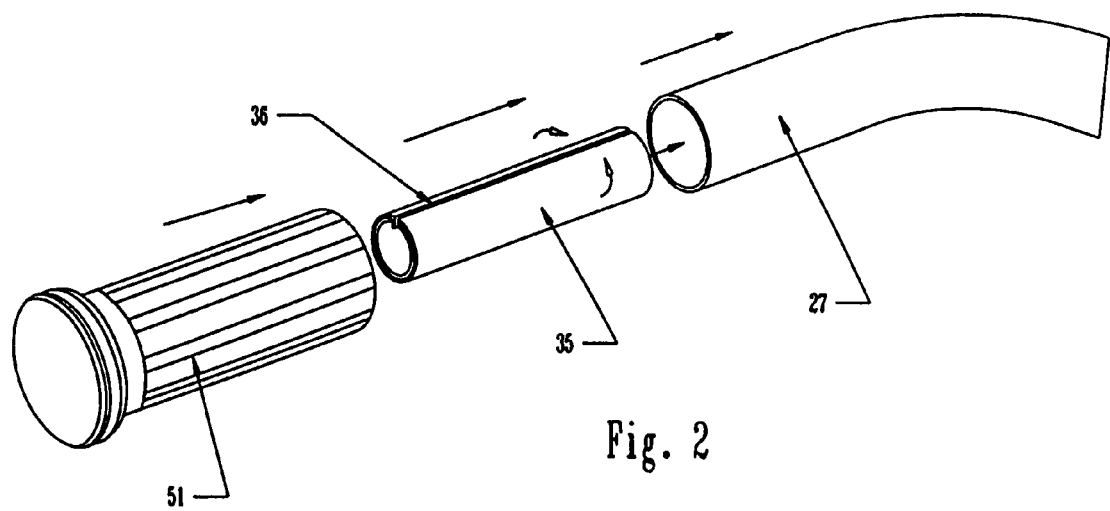
FIG. 2 is an exploded view showing the handlebar with a hand grip attached and the internal heater lined up to install inside the handlebar and the hand grip to be installed over the handlebar.

FIG. 1 shows the handlebar 27 of a motorcycle with the left grip 17 and right grip 15 installed. These grips are the items that are heated from within the handlebar to keep the hands warm and could also be those that are installed on an ATV, snowmobile, and other vehicles or equipment like a snow blower. FIG. 2 illustrates the core of this invention where the internal heater assembly 35 is lined up to be inserted inside of the handle bar 27. The metal coil or spring clip, with the heater element installed, is squeezed together or compressed, as indicated by the arrows, and placed inside of the handlebar. The planar heater that is attached to or captured inside of the metal coil or spring clip is a resistance element that can be an etched foil, silver paste, woven wire, carbon thread or any other type of heating element that is designed to provide the appropriate wattage and grip heating to keep the hands warm. Once the coiled heater assembly 35 is placed inside of the handle bar 27 and the compression force released, the spring force of the metal coil will hold the heater against the inside surface of the bar. Uniform contact of the heated coil against the handlebar is desired to transfer and spread heat evenly to the handle bar and in turn to the grip 51 mounted on the bar or like items 15 and 17 shown in FIG. 1. The handle bars are typically fabricated by rolling and seam welding with leaves a raised ridge of metal 39 on the inside of the bar. (Also illustrated in FIG. 4) A unique feature of the internal heater design with the rolled coil of this invention is the gap 36 along the length of the coil that allows it to be squeezed together. This gap when aligned with or placed over the inside welded seam of the handle bar allows the heated coil to uncoil and be in intimate contact with the remaining inside diameter of the bar and transfer even heat to the bar and in turn to the grip 51 mounted on the bar.

The other discussion associated with FIG. 2 relates to the method of manufacturing the heater assembly 35. There are a number of methods to produce this unique internal heater but there are a couple of preferred procedures. It is important that the heating element be in intimate contact with a heat sink of some sort like the metal coil or spring clip, to avoid hot spots which can result if the heating element over heats in those areas of poor contact. This may cause failure or warp the support material of the heating element. This is especially true of the polymer based heaters. Because of this contact issue, one preferred method of manufacturing is to first adhere the heating element to the flat piece of metal and then roll the two into the desired coil diameter keeping total contact between the two. Another method of manufacturing the assembly is to bend over small tabs on each side of the coil along the length of the gap 36. The size of the polymer base of the heater is selected so when it is rolled into a coil it will fit and be captured by the tabs when it is inserted on the inside diameter of the metal coil. The polymer thickness and type will provide a spring force that will hold it uniformly against the metal coil and eliminate hot spots, however this is quite difficult and can change over time. A plastic extrusion could be utilized to hold the heating element. If the heater is designed properly, it is possible for a planar type heater to be utilized without being attached to a metal coil and could be supplied with various installation tools. As mentioned earlier there are many methods to produce this internal heater but one important feature is that it be designed so it can be used in handlebars with different inside diameters. Different models of the heater assembly can be offered for bars with different inside diameters, however a design where one heated coil assembly can be utilized with bars having different inside diameters is preferred.

Figure 3:
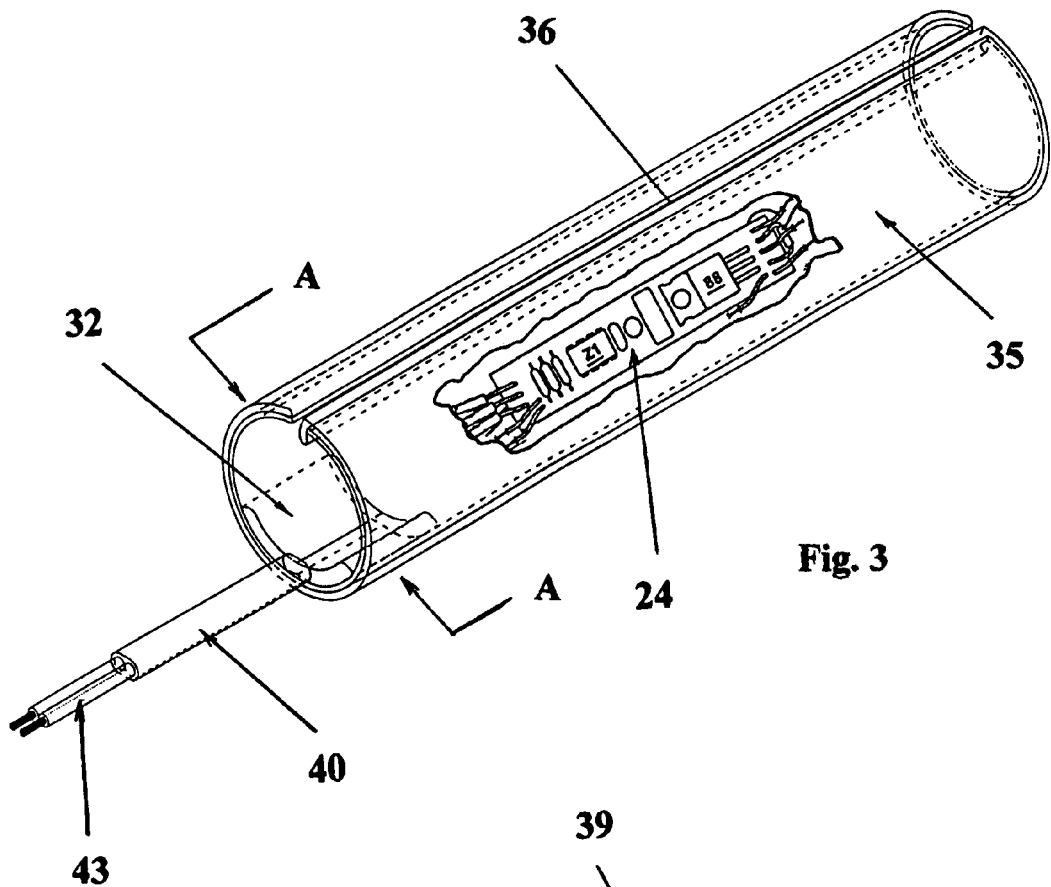
FIG. 3 is an isometric view of the internal heater with an opening in the wall exposing an optional internal electronic controller.
Figure 5:
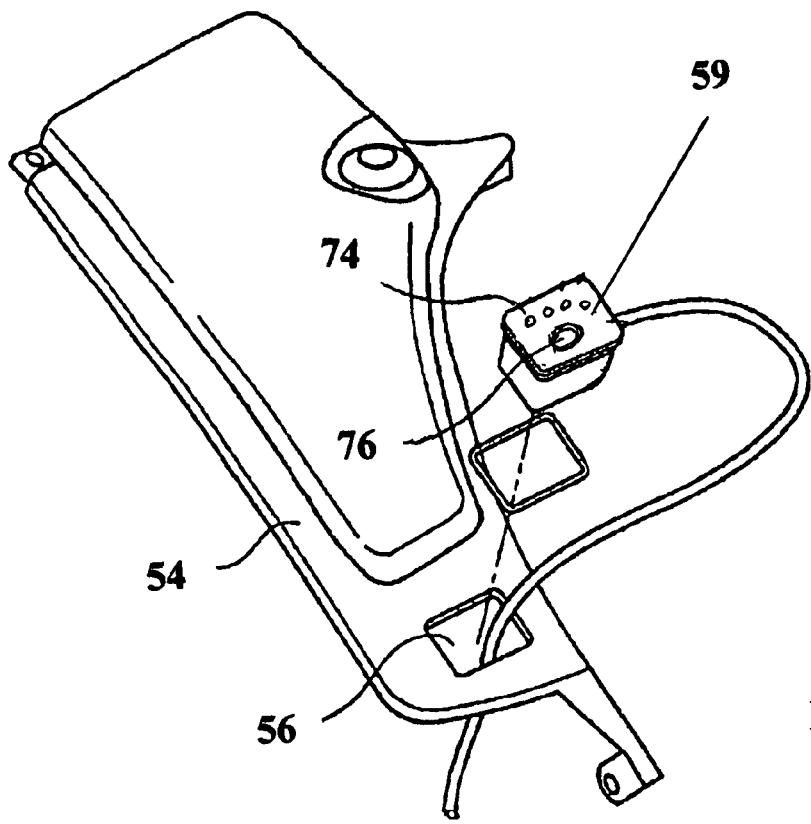
FIG. 5 is a perspective view of a vehicle panel with an electronic controller installed.

FIG. 3 shows the internal heater assembly 35 with an internal electronic controller 24 option. The temperature control for the heater can be located anywhere on the vehicle, as shown in FIG. 5 but the preferred location is where it is easiest to mount and requires the least effort to connect the electrical supply. The switch to control the heat level of the grips will be located close to the grips so it can be pressed easily and the LED's or heat level indicator will also be located where the operator can see what heating level has been selected. The electronic controller 24 for the grip heaters when mounted inside of the internal heater assembly will make a convenient installation. Selection of components will be need to take into consideration the elevated temperature inside the handle bar because of the close proximity of the heating element.

Figure 4:
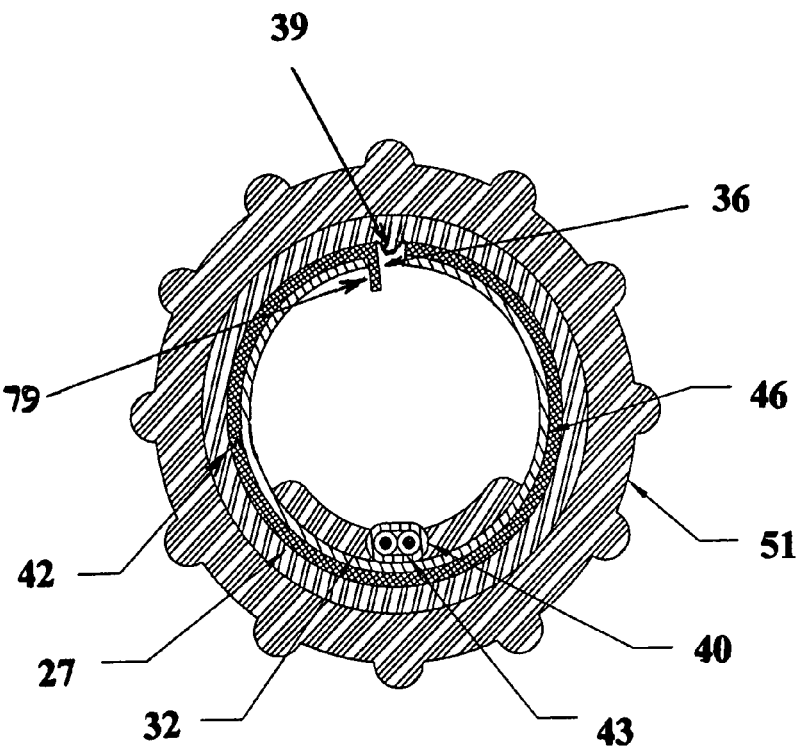
FIG. 4 is a cross-section view showing a handlebar with a grip on the outside and the internal heater with electrical connections.

FIG. 3 and FIG. 4 show the electrical wires 43 that are attached to the heater and preferably incased by a sleeve 40 for a cleaner installation and protection of the wires. These wires will be connected to the controller, which will get power from the vehicle's battery. They can be connected to the heater by many methods such as soldering, crimping, or welding. In a number of assemblies these wires will also have some kind of insulation or strain relief like that shown which is a silicone pad 32 attached to the heater.

FIG. 4 is a cross-section through A-A of FIG. 3 (after the heater is installed in the handlebar and the grip replaced) to show the various items when the internal heater is installed in the handle bar. The grip 51 is installed over the handle bar 27 and the rolled metal coil 42 is installed inside of the handle bar. This metal coil makes contact with the internal wall of the handle bar for nearly the entire circumference and in turn transfers the heat to the bar. This metal coil also shows a tab 79 on the end that is created in the manufacturing process and can be used as a locator for the heater 46 or with a tab on each end of the metal coil the heater can captured the heater inside. The electrical wires 43 are enclosed in a sleeve 40 and attached to the heater, then capped with the silicone pad 32. The cross-section view also shows the gap 36 in the internal heater assembly and the positioning over the welded seam 39 on the inside of the handlebar.

FIG. 5 shows the optional mounting of a temperature controller assembly 59 in a panel 54 on a vehicle. This kind of mounting would be done if there is not sufficient space on the handlebar to accommodate the controller or the selector switch 76 and LED indicators 74. It is obvious that many kinds of mounts would be acceptable if they were nice looking. Even a surface mount on a panel that would eliminate the need to cut a mounting hole could be selected. The temperature control can be a simple rheostat with a rotary knob to change the input voltage or it can be an electronic controller with a microprocessor to be able to add other features such as an automatic shutdown, LED brightness control, or other programming desires. A thermistor can also be added permanently or as an option to the internal heater assembly to provide a temperature feedback to the controller for added control and over heat protection.

Figure 6:
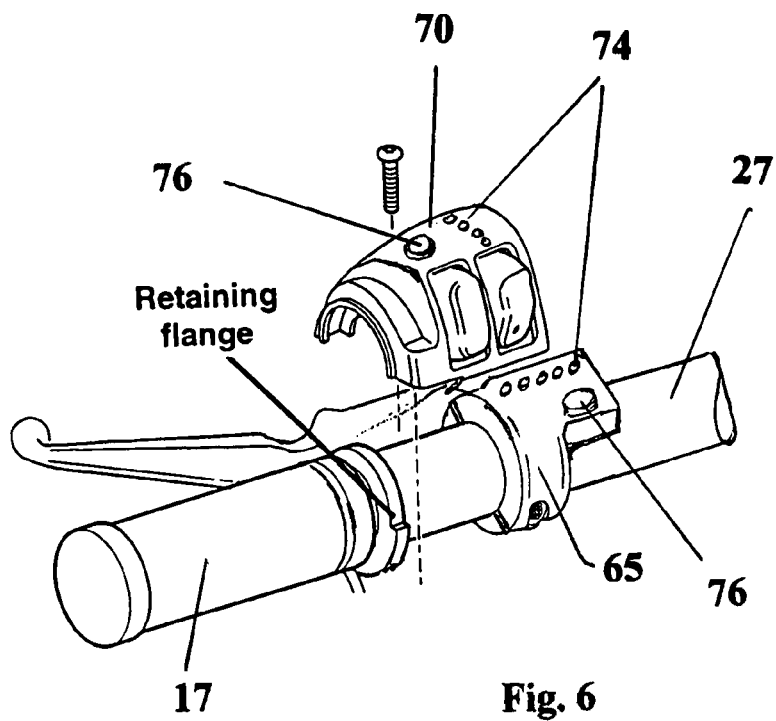
FIG. 6 is a perspective view showing a typical motorcycle hand grip with two types of switch or controller devices and LED heat level indicators.

FIG. 6 is a perspective view of the left grip 17 mounted on a motorcycle handle bar 27. This figure shows two different assemblies and mountings for the switch 76 and LED indicators 74 that would be used with the controller and internal handlebar heater. As novel and just as important as the internal heater is to this invention, so is the unique incorporation of the controller, switch, and heat level indicators. Mounting the selector switch and heat level indicators in a position where the vehicle operator is not required to remove his hands from the grip or his eyes from the road is a very important safety improvement. There are numerous designs that can be utilized to support this safety feature but the two that are shown would allow the operator to press the selector switch 76 with the thumb while keeping the fingers on the grip 17. Item 70 is a switch housing that is typical on a number of motorcycles and item 65 is a coupling that is also typical and used to mount the clutch or brake handle and the rear view mirror. Both of these items can be modified to mount the selector switch and heat level LED indicators or new items can be fabricated to provide the installation. The electronic controller can also be incorporated into these items or it can be located elsewhere, however if it can be included it provides an easier installation with less wiring and a lower cost. The coupling 65 that is shown is typically split into a top and bottom half and clamped around the handlebar with mounting screws. The preferred design for the selector switch, heat level indicators, and electronic controller will be a die cast or molded assembly that will replace the existing top half of the coupling and be compatible with a majority of motorcycles and other vehicles. This new top half of the coupling will be screwed to the bottom half like the previous pair but house the grip heater control components and still be used to mount the clutch, rear view mirror, and be clamped to the handlebar.

Figure 7:
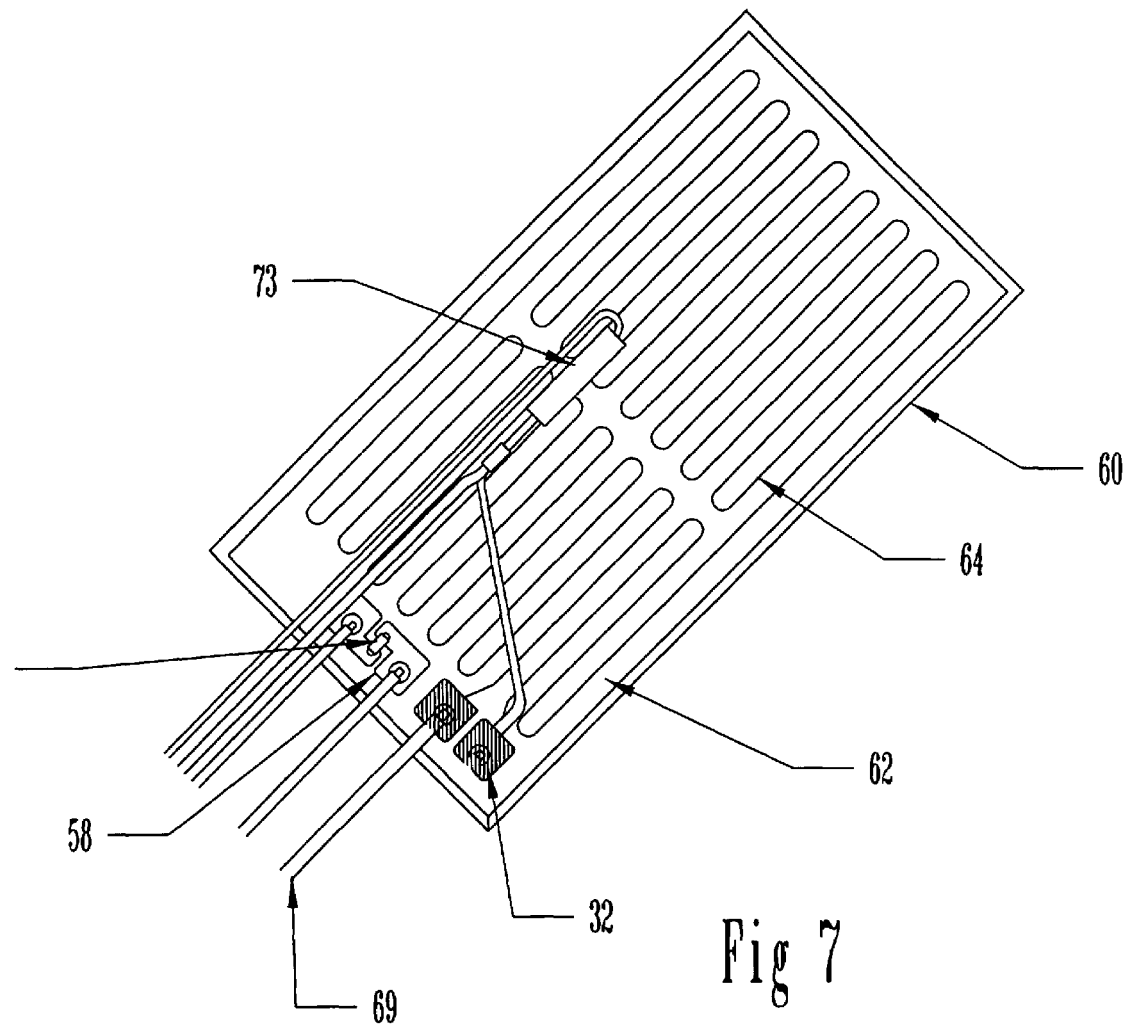
FIG. 7 is a perspective view of the heating element before it is rolled into the spring type of sleeve that is installed inside of the handle bar.

FIG. 7 is a perspective view of the heater assembly and a continuation of the description of the heater construction. The heater base 60 can be a number of different materials but typically would be a highly conductive material like aluminum which is fairly inexpensive. The type of aluminum is also important because these vary from alloys that are quite soft with no spring function to very hard and brittle ones which would crack when formed into a sleeve. It is important that this material has a spring quality that will allow it to be compressed to be inserted into the handle bar and then expand outward to form a solid contact with the internal wall. A number of aluminum alloys are candidates but the preferred alloy is 1100-H19 which can be formed into the cylindrical sleeve or coil and yet retains the desired spring feature. The thickness is also important so the base blank can be formed easily and provides the desired features described above to transfer the heat into the handle bar. A range of base thickness' could be utilized but the preferred one is 0.010 inch which provides the desired spring force after forming so it can be easily compressed to insert it into the handle bar.

The other item shown is FIG. 7 is the Heater Assembly 62 that is securely adhered to the aluminum base with a high temperature high bond adhesive like the 3M # 300 LSE. As mentioned earlier this heater can have various constructions, but the preferred Heater Assembly consists of a 3 mil polyester base with an etched 2 mil cupro-nickel heating element design 64 and covered with another 3 mil insulating sheet. This heat laminated cover sheet has holes in it 58 so after assembly the electrical wires 69 can be soldered to the heating element. A thermistor 66 is added to this Heater Assembly 62 to feed back temperature data to the Controller 59 or 65 so a precise temperature can be achieved on the heated grips. Another item that is part of the Heater Assembly is the thermal fuse 73 that is adhered to the surface of the heater to assure that the heater does not get too hot. If the electronic control failed the thermal fuse would open and interrupt power to the heater so the heated grips would not melt and cause an accident. The electrical wires, thermistor, silicone cap, and thermal fuse are added after the cylindrical sleeve has been formed.

Figure 8:
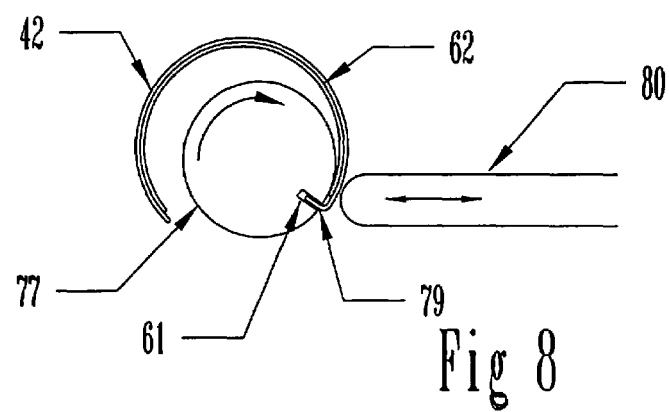
FIG. 8 is a cross-section showing the base blank being manufactured into a collapsible spring coil with forming equipment.

FIG. 8 shows the base blank 60 being rolled into the cylindrical sleeve 42 with the heater 62 attached. The heater is adhered to the aluminum blank so the bare edge 79 is not covered. This bare edge is inserted into a slot 61 in a mandrel that will be rotated to form the cylindrical sleeve. A forming bar 80 is automatically programmed to slide forward to put pressure against the mandrel and form the aluminum blank into the sleeve as it rotates. The tab 79 that is bent over as the mandrel rotates also serves to hold the blank in place to complete the forming of the sleeve. After the forming process the mandrel is programmed to return to a home position so the sleeve can be removed and the next blank inserted. The mandrel is machined to a smaller diameter to produce the sleeves with a desired larger diameter because in the forming process the aluminum blank springs slightly away from the mandrel. As stated above the final assembly of the heated sleeves is completed on the rolled cylinder by soldering on the wires, adding the thermistor, adding the silicone cap, and the thermal fuse. These are added after the rolling operation so the components are not damaged and the aluminum blank is not distorted.

The invention that has been described above is a novel idea for an internal handle bar grip heater assembly and a method of manufacturing the internal heater assembly. The important difference between this design and others on the market is this is a grip heater and the others are heated grips. The internal handlebar grip heater assembly is novel because of the easy way it is installed but also because it offers a uniquely safe upgrade where after the grip heaters are in place the heat level can be adjusted without the operator having to take their hand off of the grip and heat level setting observed without taking their eyes off the road. The previous discussion highlights the advantages of being able to utilize the internal handle bar heaters with the heat spreading feature and an electronic heat level control. In some cases there is a requirement for the remote installation of the controller, heat selection switch, and indicators but regardless of the mounting options it will be the preferred method for keeping the hands warm.

We claim:

1. A handlebar heating assembly for use in hollow handlebars, comprising:
   a planar heating element, wherein the heating element is formed into a cylindrical shape sized to allow the heating element to fit coaxially into an open end of the handlebar and shaped to provide substantial contact with the handlebar;
   a conductive spring clip, wherein the spring clip is substantially co-extensive with a length of the planar heating element, and further wherein the spring clip is shaped into a cylindrical form capable of being compressed radially to a size to allow the spring clip and heating element to fit coaxially in the open end of the handlebar and upon release of the compression, said spring clip expands radially to provide substantial contact of the spring clip with the handlebar; and
   a means for connecting to a power source.

2. A handlebar heating assembly according to claim 1 wherein the heating element is secured to the spring clip.

3. A handlebar heating assembly according to claim 1 wherein the power source is a battery.

4. A handlebar heating assembly according to claim 1 further comprising a means for temperature control of the heating element.

5. A handlebar heating assembly according to claim 2 wherein the heating element is adhered to the spring clip with an adhesive.

6. A handlebar heating assembly according to claim 5 wherein the adhesive is a high temperature, high bond adhesive.

7. A handlebar heating assembly according to claim 1 wherein the spring clip is an aluminum alloy having a spring quality sufficient to allow compression to fit the spring clip within the handlebar and expansion upon release of the compression sufficient to provide substantial contact with the internal wall of the handlebar.

8. A handlebar heating assembly according to claim 7 wherein the aluminum alloy is 1100-H19.

9. A handlebar heating assembly according to claim 7 wherein the aluminum spring clip is about 0.01 inches thick.

10. A handlebar heating assembly according to claim 7 wherein the planar heating element comprises a polyester base with an etched cupro-nickel heating element and the aluminum alloy is 11-H19.

11. A handlebar heating assembly according to claim 10 wherein the spring clip is about 0.01 inches thick.

12. A method for heating a handlebar comprising the steps of:
   a) providing a handlebar with an internal space,
   b) providing a planar heating element wherein said heating element is formed into a cylindrical shape sized to allow the heating element to fit coaxially into an open end of the handlebar and shaped to provide substantial contact with the handlebar, attaching the heating element to and substantially co-extensive with a conductive spring clip, said spring clip shaped into a cylindrical form capable of being radially compressed to a size to fit coaxially within the internal space in the handlebar and upon release of the compression, said spring clip expanding radially to provide substantial contact of the spring clip with the handlebar, and
   c) providing a power source for the heating element.

13. A method for heating a handlebar according to claim 12 further providing a means for controlling the temperature of the heating element.

* * * * *